United States Patent
Song et al.

(10) Patent No.: US 11,911,723 B2
(45) Date of Patent: Feb. 27, 2024

(54) HONEYCOMB STRUCTURE BODY, HONEYCOMB STRUCTURE FILTER, AND EXTRUSION MOLDING DIE

(71) Applicant: ShanDong Sinocera Functional Material Co., Ltd, Shandong (CN)

(72) Inventors: Xibin Song, Shandong (CN); Bing Zhang, Shandong (CN); Xi Zhang, Shandong (CN)

(73) Assignee: SHANDONG SINOCERA FUNCTIONAL MATERIAL CO., LTD, Shandong (CN)

( * ) Notice: Subject to any disclaimer, the term of this patent is extended or adjusted under 35 U.S.C. 154(b) by 54 days.

(21) Appl. No.: 17/059,827

(22) PCT Filed: Jul. 12, 2019

(86) PCT No.: PCT/CN2019/095894
§ 371 (c)(1),
(2) Date: Nov. 30, 2020

(87) PCT Pub. No.: WO2020/191955
PCT Pub. Date: Oct. 1, 2020

(65) Prior Publication Data
US 2022/0241715 A1    Aug. 4, 2022

(30) Foreign Application Priority Data

Mar. 25, 2019 (CN) .......................... 201910228431.6
May 15, 2019 (CN) .......................... 201920691233.9

(51) Int. Cl.
*B01D 46/24* (2006.01)
*F01N 3/022* (2006.01)
*B28B 3/26* (2006.01)

(52) U.S. Cl.
CPC .......... *B01D 46/2429* (2013.01); *B28B 3/269* (2013.01); *F01N 3/0222* (2013.01); *B01D 2239/125* (2013.01); *B01D 2279/30* (2013.01)

(58) Field of Classification Search
None
See application file for complete search history.

(56) References Cited

U.S. PATENT DOCUMENTS

| 5,942,260 A | 8/1999 | Kodama et al. |
| 6,247,915 B1 | 6/2001 | Miyazaki |
| (Continued) | | |

FOREIGN PATENT DOCUMENTS

| CN | 104066511 A | 9/2014 |
| CN | 105269660 A | 1/2016 |
| (Continued) | | |

OTHER PUBLICATIONS

Machine translation of DE102015003455A1, translated via EPO on Apr. 20, 2023 (Year: 2015).*

(Continued)

*Primary Examiner* — Elizabeth Collister
(74) *Attorney, Agent, or Firm* — CANTOR COLBURN LLP

(57) ABSTRACT

A honeycomb structure body, which includes a honeycomb body and a skin layer, the honeycomb body including axially extending channels defined by a porous wall, wherein a radial path of a radial section of the honeycomb body from a central axis to the skin layer consists of a porous wall inner section and a porous wall outer section in sequence, an average wall thickness of inner porous walls provided in the porous wall inner section is smaller than an average wall thickness of outer porous walls provided in the porous wall outer section, and a length of the porous wall inner section in the radial path accounts for 71%-95%. The specific (Continued)

structure of the honeycomb structure body not only increases the strength of the honeycomb structure body, but also ensures good thermal shock resistance and small back pressure.

6 Claims, 3 Drawing Sheets

(56) References Cited

U.S. PATENT DOCUMENTS

| | | | |
|---|---|---|---|
| 9,533,294 B2 | 1/2017 | Hayashi et al. | |
| 2006/0088621 A1 | 4/2006 | Matsuoka et al. | |
| 2009/0291836 A1 | 11/2009 | Ohno et al. | |
| 2015/0005153 A1* | 1/2015 | Hayashi | B01D 53/94 502/87 |

FOREIGN PATENT DOCUMENTS

| | | |
|---|---|---|
| CN | 108590822 A | 9/2018 |
| CN | 109469535 A | 3/2019 |
| CN | 109944662 A | 6/2019 |
| DE | 102015003455 A1 * | 9/2015 ............. B01J 32/00 |
| EP | 2236205 A2 | 10/2010 |
| JP | H0976219 A | 3/1997 |
| JP | H11268018 A | 10/1999 |
| JP | 2000127131 A | 5/2000 |
| JP | 2006116814 A | 5/2006 |
| JP | 2008149595 A | 7/2008 |
| JP | 2008178858 A | 8/2008 |
| JP | 2008200605 A | 9/2008 |
| JP | 2010228285 A | 10/2010 |
| WO | 0241972 A1 | 5/2002 |
| WO | 2013111778 A1 | 8/2013 |

OTHER PUBLICATIONS

Wayback machine capture of https://www.corning.com/worldwide/en/innovation/materials-science/ceramics/how-it-works-filters-and-substrates.html, captured on Aug. 4, 2017 (Year: 2017).*
Chinese Search Report Application No. PCT/CN2019/095894; pp. 3.
Office Action issued in Japanese Application No. 2020-567250; Application Filing Date May 15, 2019; dated Nov. 24, 2021 (13 pages).

* cited by examiner

HONEYCOMB STRUCTURE BODY, HONEYCOMB STRUCTURE FILTER, AND EXTRUSION MOLDING DIE

TECHNICAL FILED

The present application relates to a honeycomb structure body, a honeycomb structure filter and an extrusion molding die, and belongs to the field of vehicle exhaust purification materials.

BACKGROUND OF THE APPLICATION

Particulate filters are used to filter fine particulate matter (PM) emitted by gasoline and diesel vehicles. The particulate filter structure is composed of a honeycomb body and a plugging part. The compartments separated by the porous walls constitute the honeycomb body, and the plugging part forms a "chess" cross at the inlet and outlet ends of the honeycomb body. The exhaust discharged from the engine passes through the inlet end of the honeycomb filter, the fine particulate matters carried by the gas are intercepted by the plugging part, and the gas passes through the porous partition walls into the adjacent compartment and flows out. The honeycomb particulate filters include gasoline particulate filters (GPF) and diesel particulate filters (DPF). The mature material of honeycomb particulate filters is ceramic.

With the strict restrictions on PM and PN by emission regulations, particulate filters are required to have a high porosity. For example, the porosity of gasoline particulate filters is 60~70%. The high porosity leads to low strength of particulate filters. Defects may be caused in the production process, product transportation, catalyst coating, and packaging process, which may cause cracks and lead to product scrapping.

In view of the problem of insufficient strength of high-porosity particulate filters such as gasoline particulate filters, in the prior art, the second outer peripheral wall is arranged on the first outer peripheral wall by a spraying method after the "one-piece ceramic honeycomb structure body" is formed by extrusion to make up for the insufficient strength of the first peripheral wall. In addition, there is also the same technology as the DPF treatment for the peripheral skin layer, i.e., the outer peripheral wall of the ceramic honeycomb structure body is removed by the processing method of cylindrical grinding; then, a skin grafting process is used to replace the removed outer peripheral wall with a coating material containing inorganic ceramic material to form an outer-coated ceramic honeycomb body. Both the secondary-coated ceramic honeycomb body and the outer-coated ceramic honeycomb body can strengthen the outer circumference of the ceramic honeycomb. However, the secondary coating and the outer coating require more processes, and more control points in the production process increase, so that the difficulty of ensuring product consistency is increased. Further, since the gasoline particulate filter is small in size, more processes will reduce the production efficiency of the gasoline particulate filter.

SUMMARY OF THE INVENTION

To solve the above problem, the present application provides a honeycomb structure body and a honeycomb structure filter; the arrangement of the specific structure of the honeycomb structure body not only increases the strength of the honeycomb structure body, but also ensures good thermal shock resistance and small back pressure; and the honeycomb structure body of the present application is prepared by integral molding, thereby achieving high production efficiency and low preparation cost.

The honeycomb structure body includes a honeycomb body and a skin layer around the honeycomb body. The honeycomb body includes axially-extending channels defined by a porous wall. A radial path of a radial section of the honeycomb body from a central axis to the skin layer consists of a porous wall inner section and a porous wall outer section in sequence. An average wall thickness of inner porous walls provided in the porous wall inner section is smaller than an average wall thickness of outer porous walls provided in the porous wall outer section, and a length of the porous wall inner section in the radial path accounts for 71%-95%.

Further, the length of the porous wall inner section in the radial path accounts for 75%-90%. More further, the length of the porous wall inner section in the radial path accounts for 80% or 85% as a lower limit and for 80% or 85% as an upper limit. When the length of the porous wall inner section in the radial path accounts for smaller than 71%, the back pressure of the honeycomb structure body is significantly increased; when the length of the porous wall inner section in the radial path accounts for greater than 95%, the strength of the honeycomb structure body is not increased significantly.

Optionally, a ratio of an average wall thickness of the inner porous walls to an average wall thickness of the outer porous walls is 1:1.1-1.8. Further, a ratio of an average wall thickness of the inner porous walls to an average wall thickness of the outer porous walls is 1:1.1-1.7. More further, a ratio of an average wall thickness of the inner porous walls to an average wall thickness of the outer porous walls is 1:1.3-1.5. The increase of the wall thickness of the outer porous walls may increase the strength of the honeycomb structure body; when the ratio of an average wall thickness of the inner porous walls to an average wall thickness of the outer porous walls is smaller than 1:1.1, the strength of a ceramic honeycomb is not increased significantly; when the ratio of an average wall thickness of the inner porous walls to an average wall thickness of the outer porous walls is greater than 1:1.8, excessive difference in the wall thickness results in a decrease in the thermal shock resistance of the honeycomb structure body.

Optionally, the inner porous walls and/or the outer porous walls have a uniform wall thickness. Further, the inner porous walls and the outer porous walls have a uniform wall thickness.

Optionally, the inner porous walls have a wall thickness of 0.15 mm-0.40 mm. Preferably, the inner porous walls have a wall thickness of 0.22 mm.

Optionally, the skin layer has a thickness of 0.5 mm-1.1 mm. Further, the skin layer has a thickness of 0.7 mm-1 mm. More further, the skin layer has a thickness of 0.8 mm-0.9 mm. When the thickness of the skin layer is greater than 0.5 mm, the skin layer with high porosity may withstand great fracture stress, and the isostatic strength is significantly improved; if the thickness of the skin layer is smaller than 0.5 mm, the skin layer is likely to be damaged due to insufficient strength; when the thickness of the skin layer is greater than 1.1 mm, the deterioration of the directional arrangement of ceramic raw materials leads to reduced thermal shock performance and excessive thickness of the skin layer, which may cause distortion of the outer porous walls connected to the skin layer during the molding process, causing degradation of other performances.

In the present application, through the increase of the thickness of the skin layer and the wall thickness of the outer porous walls at the region connected to the skin layer, the isostatic strength of the honeycomb structure body is improved while good thermal shock resistance and small back pressure are ensured.

Optionally, the honeycomb body is a cylinder body, the radial sections of the channels are square, and the channels include inlet channels and outlet channels. Further, the radial sections of the channels include rounded or chamfered squares, or any other shape.

Further, the honeycomb body and the skin layer of the honeycomb structure body are integrally molded.

Optionally, a preparation method for the honeycomb structure body includes steps of: mixing a ceramic raw material, a binder, a pore former and a lubricant with a mass ratio of 70-120:4-8:12-18:0.5-3, kneading into clay, and extruding, cutting, drying, shaping, plugging and sintering, to prepare the honeycomb structure body.

Further, the mass ratio of the ceramic raw material, the binder, the pore former and the lubricant is 100:6:15:2.

Further, the ceramic raw material is selected from a mixture of talc, kaolin, calcined kaolin, alumina, aluminum hydroxide, boehmite and silica which may be fired into a cordierite ceramic honeycomb.

Optionally, the binder is selected from methyl cellulose and/or hydroxypropyl methyl cellulose. Further, the binder is hydroxypropyl methyl cellulose.

Optionally, the pore former is selected from one or a mixture of potato starch, tapioca starch, and corn starch. Further, the pore former is potato starch. More further, the pore former is potato starch.

Optionally, the lubricant is selected from at least one of tall oil fatty acid, salad oil and rapeseed oil. Further, the lubricant is tall oil fatty acid.

Optionally, the material of the honeycomb structure body is selected from at least one of cordierite, silicon carbide, metal, aluminum titanate and mullite. Further, the material of the honeycomb structure body is cordierite.

According to another aspect of the present application, a preparation method for a honeycomb structure body is provided, and in the method, a raw material is extruded by an extruder to obtain a honeycomb structure body in which a honeycomb body and a skin layer are integrally molded.

According to a still another aspect of the present application, a honeycomb structure filter is provided, the honeycomb structure filter is prepared by a honeycomb structure body, and the honeycomb structure body is selected from any one of the honeycomb structure bodies and a honeycomb structure body prepared by any one of the above methods.

Optionally, the honeycomb structure filter is prepared by subjecting the honeycomb structure body to catalyst coating and packaging processes.

According to a still another aspect of the present application, an extrusion molding die for a honeycomb structure body is provided, and the die may prepare an integrally-molded honeycomb structure body with high strength, good thermal shock resistance and small back pressure; and the production efficiency is high and the preparation cost is low.

The extrusion molding die for the honeycomb structure body includes an upper injection section and a lower extrusion section, the upper injection section being provided with a plurality of injection holes, the lower extrusion section being provided with an intersecting extrusion groove array and a die sleeve disposed around the extrusion groove array, the extrusion groove array and the die sleeve forming an annular groove in an enclosing manner, the plurality of injection holes separately communicating with extrusion grooves and the annular groove, wherein a die radial path of a section of the extrusion groove array from a center axis to the annular groove is composed of an extrusion groove inner section and an extrusion groove outer section in sequence, groove widths of the extrusion grooves provided in the extrusion groove inner section are smaller than groove widths of the extrusion grooves provided in the extrusion groove outer section, and a length of the extrusion groove inner section in the die radial path accounts for 71%-87%.

Further, the length of the extrusion groove inner section in the die radial path accounts for 75%-85%. Further, the length of the extrusion groove inner section in the die radial path accounts for 80% or 85% as a lower limit and for 75% or 80% as an upper limit. When the length of the extrusion groove inner section in the die radial path accounts for smaller than 71%, the back pressure of the honeycomb structure body may be significantly increased; when the length of the extrusion groove inner section in the die radial path accounts for greater than 87%, the strength of the honeycomb structure body is not increased significantly.

Optionally, a ratio of an average groove width of the extrusion grooves of the extrusion groove inner section to an average groove width of the extrusion grooves of the extrusion groove outer section is 1:1.2-1.8. Further, a ratio of an average groove width of the extrusion grooves of the extrusion groove inner section to an average groove width of the extrusion grooves of the extrusion groove outer section is 1:1.3-1.7. More further, a ratio of an average groove width of the extrusion grooves of the extrusion groove inner section to an average groove width of the extrusion grooves of the extrusion groove outer section is 1:1.3-1.5. The increase of the groove widths of the extrusion grooves of the extrusion groove outer section may increase the strength of the prepared honeycomb structure body; when the ratio of an average groove width of the extrusion grooves of the extrusion groove inner section to an average groove width of the extrusion grooves of the extrusion groove outer section is smaller than 1:1.2, the strength of the honeycomb structure body is not increased significantly; when the ratio of an average groove width of the extrusion grooves of the extrusion groove inner section to an average groove width of the extrusion grooves of the extrusion groove outer section is greater than 1:1.8, excessive difference in the extrusion groove widths of the extrusion groove inner section and the extrusion groove outer section results in a decrease in the thermal shock resistance of the prepared honeycomb structure body.

Optionally, an average groove width of the extrusion grooves of the extrusion groove inner section is 0.15 mm-0.40 mm. Preferably, an average groove width of the extrusion grooves of the extrusion groove inner section is 0.20 mm-0.24 mm. More preferably, an average groove width of the extrusion grooves of the extrusion groove inner section is 0.22 mm.

Optionally, the extrusion grooves of the lower extrusion section extend axially along the molding die, a side surface of the extrusion groove array extends inwardly in an inclined manner along a direction from top to bottom of the molding die, and a part of an inner surface of the die sleeve is disposed in parallel with the side surface of the extrusion groove array to form the annular groove.

Optionally, an angle $\alpha$ between the side surface of the extrusion groove array and an axis of the molding die is 30°-60°.

The angle α between the side surface of the extrusion groove array and an axis of the molding die is 37°-53°. More further, the angle α between the side surface of the extrusion groove array and an axis of the molding die is 40°-50°. When the angle α between the side surface of the extrusion groove array and an axis of the molding die is greater than 60°, gas channels connected to the skin layer of the honeycomb structure body with high porosity prepared by the extrusion die are likely be squeezed and deformed, and the isostatic strength is significantly decreased; when the angle α between the side surface of the extrusion groove array and an axis of the molding die is smaller than 30°, the skin layer of the honeycomb structure body prepared by the extrusion die is not strong enough and is likely to be damaged.

Optionally, the side surface of the extrusion groove array is disposed in parallel with an inner wall of the die sleeve to form the annular groove, and the annular groove has a groove width of 0.5 mm-1.1 mm. Preferably, the annular groove has a groove width of 0.7 mm-1 mm. When the annular groove has a groove width smaller than 0.5 mm, the strength of the skin layer of the prepared honeycomb structure body is low; when the annular groove has a groove width greater than 1.1 mm, a slurry is prone to squeeze and deform pores shape of the filter.

In the present application, by controlling the proportion of the length of the extrusion groove inner section, the width of the annular groove, the groove widths of the extrusion grooves and the angle α, the isostatic strength of the honeycomb structure body is significantly improved while good thermal shock resistance and small back pressure are ensured.

Optionally, the groove widths of the extrusion grooves of the extrusion groove inner section are equal, and/or the groove widths of the extrusion grooves of the extrusion groove outer section are equal.

Optionally, the extrusion groove array communicates with the annular groove, and the section of the extrusion groove array is of a square lattice structure.

Optionally, the injection hole is cylindrical, and the injection holes and intersections of the intersecting extrusion grooves communicate with each other. Preferably, a portion where the injection hole is connected to the extrusion groove has a circular truncated cone shape.

Optionally, the injection hole has a depth of 5 mm-40 mm, and the injection hole has a hole diameter of 0.6 mm-3.0 mm. Preferably, the injection hole has a depth of 10 mm-30 mm, and the injection hole has a hole diameter of 0.9 mm-2.0 mm.

The beneficial effects of the present application include, but are not limited to:

1. For the honeycomb structure body according to the present application, the increases of the thickness of the skin layer and the wall thickness of the outer porous wall of the honeycomb body close to the skin may increase the strength of the honeycomb structure body, and the region where the wall thickness of the outer porous wall is increased and the ratio of different wall thicknesses are defined, so that the honeycomb structure body not only satisfies the effect of increasing the strength, but also has good thermal shock resistance and small back pressure.

2. According to the preparation method for the honeycomb structure body of the present application, the preparation method for the honeycomb structure body molds the honeycomb body and the skin layer integrally, and the skin layer does not need to be processed again, which results in high production efficiency and low preparation cost.

3. For the honeycomb structure filter according to the present application, when the filter is used as a vehicle filter such as a gasoline particle trap, the filter has high strength, good thermal shock resistance and small back pressure.

4. For the molding die for the honeycomb structure body of the present application, the increase of the width of the annular groove, the inclined angle α of the extrusion groove array and the groove widths of the extrusion grooves of the extrusion groove outer section may enhance the strength of the honeycomb structure body prepared therefrom, and the region of the extrusion groove outer section and the values of the groove widths of the extrusion grooves are defined, so that the honeycomb structure body prepared by the molding die has the performances of high strength, good thermal shock resistance and low back pressure.

5. According to the preparation method for the honeycomb structure body of the present application, the honeycomb structure body prepared therefrom is molded integrally, and the skin layer of the honeycomb structure body does not need to be processed again, which results in high production efficiency and low preparation cost.

BRIEF DESCRIPTION OF THE DRAWINGS

The drawings described herein are used to provide a further understanding of the present application and form a part of the present application. The schematic embodiments and descriptions of the present application are used to explain the present application and do not constitute an undue limitation on the present application. In the drawings.

DETAIL DESCRIPTION OF EMBODIMENTS

Figure 1:
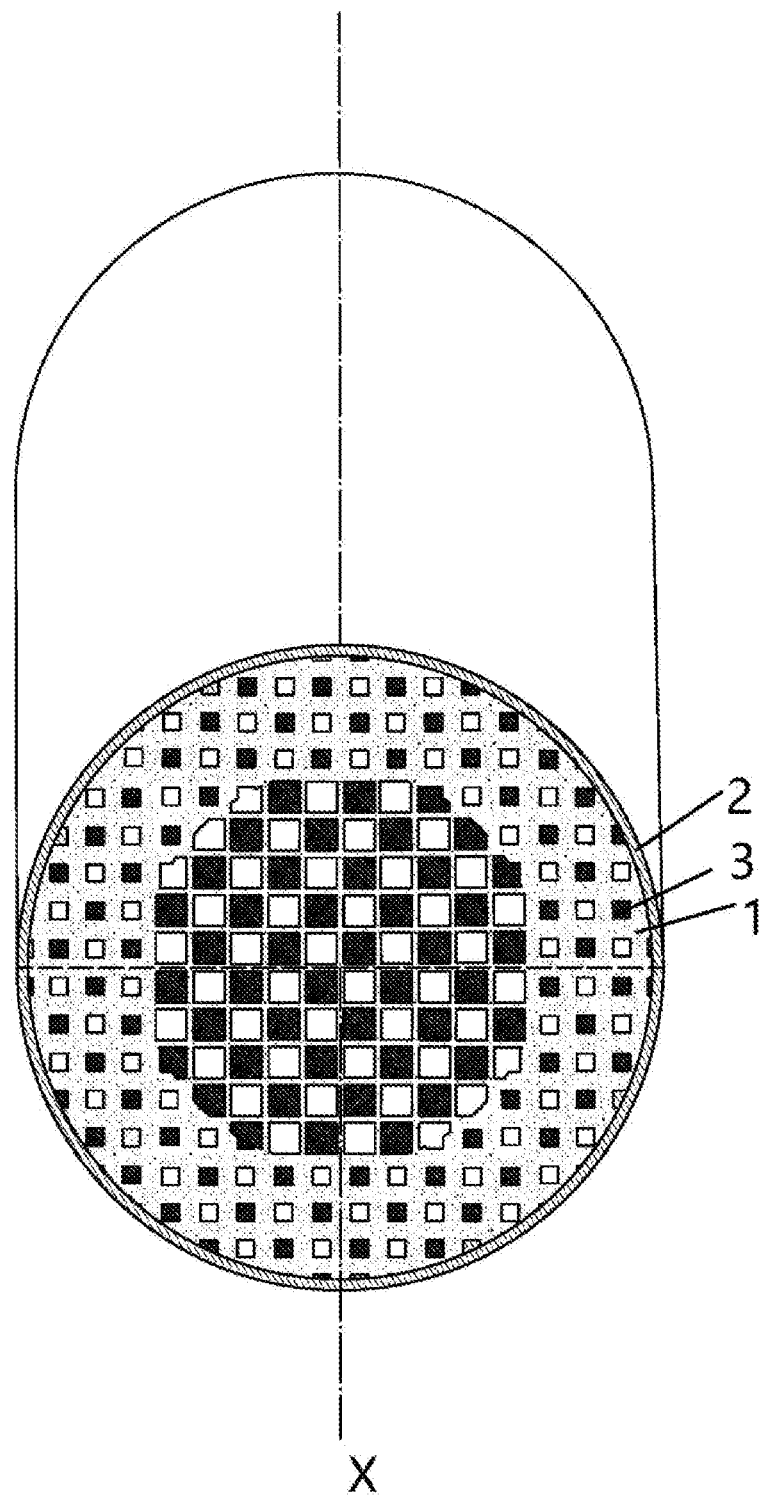
FIG. 1 is a three-dimensional schematic diagram of a honeycomb structure body according to an embodiment of the present application.

The present application will be described in detail below with reference to embodiments, but the present application is not limited to these embodiments.

Unless otherwise specified, the raw materials and catalysts in the embodiments of the present application are purchased through commercial channels.

The analysis methods in the embodiments of the present application are as follows:

A stainless steel pressure vessel is used for an isostatic strength test. The isostatic strength analysis method includes: (1) sleeving an evaluation object with a hollow cylindrical rubber sleeve, with the evaluation object wrapped tightly by the rubber sleeve and two ends of the rubber sleeve sealed with cover plates; (2) putting the above entirely into a container with water as the medium, and sealing the container; (3) pressurizing the sealed container, and keeping the temperature for 5 min when a certain set pressure is reached, wherein the evaluation object may not pass the set pressure if a sound is heard within 5 min, and the evaluation object may pass the set pressure if a sound is not heard within 5 min.

SuperFlow's SF-1020 model flow back pressure tester is used for a back pressure test. The method for the back pressure test includes setting an air flow rate to 6 Nm³/min, and comparing and evaluating the back pressure values of the embodiments.

A muffle furnace is used for thermal shock resistance test. The honeycomb structure body as the evaluation object is fed into a resistance furnace that has reached a predetermined temperature, and after keeping the temperature for 30 minutes, a gasoline particulate filter is removed from the resistance furnace to observe whether the skin and end surface are cracked in time. If no cracks are found, the gasoline particulate filter is cooled down to room temperature (25° C.) before putting into the resistance furnace. The above process is repeated three times; if cracks are found, the test is stopped. If no cracks are found, the resistance furnace is heated to 50° C., and the above process is repeated three times again. The temperature at which cracking occurred is used as an evaluation standard.

The specific implementation of the present application will be further described in detail in combination with the drawings and the embodiments. The following embodiments are used for illustrating the present application, but not for limiting the scope of the present application.

The strength (such as isostatic strength), back pressure and thermal shock resistance of the honeycomb structure body are related performances. Changing the structure parameters of the honeycomb structure body may improve part of the performances, but often reduces other performances. The key is how to make a honeycomb structure body with high comprehensive performances. It is easy to think of increasing the strength of the honeycomb structure body by increasing the wall thickness of the porous wall. However, increasing the wall thickness of the porous wall will cause an increase in back pressure and a decrease in thermal shock resistance. The present application provides a honeycomb structure body, which may not only meet the increase in strength but also make the back pressure and thermal shock resistance good.

The present application provides a honeycomb structure body, which may be applied to the gasoline particulate filter or diesel particulate filter. The structure may refer to FIGS. 1 and 2. The honeycomb structure body includes a honeycomb body 1 and a skin layer 2 around the honeycomb body, the honeycomb body 1 including axially-extending channels defined by a porous wall. A radial path L1 of a radial section of the honeycomb body 1 from a central axis X to the skin layer 2 consists of a porous wall inner section L2 and a porous wall outer section L3; an average wall thickness of inner porous walls 11 provided in the porous wall inner section L2 is smaller than an average wall thickness of outer porous walls 12 provided in the porous wall outer section L3; a length of the porous wall inner section L2 in the radial path L1 accounts for 71%-95%, and preferably, a length of the porous wall inner section L2 in the radial path L1 accounts for 75%-90%. The radial path L1 consists of the porous wall inner section L2 and the porous wall outer section L3. When the length of the porous wall inner section in the radial path accounts for smaller than 71%, the back pressure of the honeycomb structure body is significantly increased; when the length of the porous wall inner section in the radial path accounts for greater than 95%, the strength of the honeycomb structure body is not increased significantly.

The honeycomb body 1 is, but not limited to, a cylindrical shape, and the channels may form inlet channels and outlet channels by not plugging gas channels 3 or plugging gas channels 3. There are many ways for plugging, which are not limited to the "chess" type of cross-arrangement and plugging of the gas inlet and outlet ends of the honeycomb body. The skin layer 2 and the honeycomb body 1 may be integrally formed or bonded with each other.

The inner porous walls 11 and the outer porous walls 12 may have a uniform wall thickness or a non-uniform wall thickness. When the inner porous walls 11 and the outer porous walls 12 may have a non-uniform wall thickness, a maximum thickness of the inner porous walls 11 is not greater than a minimum thickness of the outer porous walls 12. The thicknesses of the inner porous walls 11 and the outer porous walls 12 may be configured such that the wall thickness of the radial path of the radial section of the honeycomb body from the central axis to the skin layer is uniformly increased. A pore density of the inner porous walls 11 is approximately the same as that of the outer porous walls 12.

A ratio of an average wall thickness of the inner porous walls 11 to an average wall thickness of the outer porous walls 12 is 1:1.1-1.8. Preferably, a ratio of an average wall thickness of the inner porous walls 11 to an average wall thickness of the outer porous walls 12 is 1:1.1-1.7. More preferably, a ratio of an average wall thickness of the inner porous walls 11 to an average wall thickness of the outer porous walls 12 is 1:1.3-1.5. The increase of the wall thickness of the outer porous walls 12 may increase the strength of the honeycomb structure body; when the ratio of an average wall thickness of the inner porous walls 11 to an average wall thickness of the outer porous walls 12 is smaller than 1:1.1, the strength of the ceramic honeycomb is not increased significantly; when the ratio of an average wall thickness of the inner porous walls 11 to an average wall thickness of the outer porous walls 12 is greater than 1:1.8, excessive difference in the wall thickness results in a decrease in the thermal shock resistance of the honeycomb structure body.

Preferably, the inner porous walls have a wall thickness of 0.15-0.40 mm. More preferably, the inner porous walls have a wall thickness of 0.22 mm. Preferably, the inner porous walls 11 and the outer porous walls 12 have a uniform wall thickness.

Optionally, the skin layer has a thickness of 0.5 mm-1.1 mm. Further, the skin layer has a thickness of 0.7 mm-1 mm. More further, the skin layer has a thickness of 0.8 mm-0.9 mm. When the thickness of the skin layer is greater than 0.5 mm, the skin layer with high porosity may withstand greater fracture stress, and the isostatic strength is significantly improved; if the thickness of the skin layer is smaller than 0.5 mm, the skin layer is likely to be damaged due to insufficient strength; when the thickness of the skin layer is greater than 1.1 mm, the deterioration of the directional arrangement of ceramic raw materials leads to reduced thermal shock performance and excessive thickness of the skin layer, which may cause distortion of the porous wall connected to the skin layer during the molding process, causing degradation of other performances.

The strength (such as isostatic strength), back pressure and thermal shock resistance of the honeycomb structure body are related performances. Changing the structure parameters of the honeycomb structure body may improve part of the performances, but often reduces other performances. The key is how to make a honeycomb structure body with high comprehensive performances. It is easy to think of increasing the strength of the honeycomb structure body by increasing the groove width of the extrusion groove outer section of the die. However, increasing the groove width of the extrusion groove outer section of the die will cause an increase in back pressure and a decrease in thermal shock resistance. The application provides a honeycomb structure body prepared by a honeycomb structure body die, which may not only meet the increase in strength but also make the back pressure and thermal shock resistance good.

The present embodiment provides an extrusion molding die for the above honeycomb structure body, which is used to produce the honeycomb structure body; the filter may be used for filtering particles. The structure may refer to FIGS. 3 and 4. The extrusion molding die includes an upper injection section and a lower extrusion section, the upper injection section including a plurality of injection holes 9 uniformly and axially arranged along the die, the extrusion section including an intersecting extrusion groove array and a die sleeve 4 disposed around the extrusion groove array, the extrusion groove array and the die sleeve 4 forming an annular groove 13, and the plurality of injection holes 9 and intersections of extrusion grooves 10 correspondingly communicating with the annular groove 13.

The extrusion groove array communicates with the annular groove 13, and the section of the extrusion groove array is of a square lattice structure. The injection holes 9 are cylindrical, and the injection holes 9 and intersections of the intersecting extrusion grooves 10 communicate with each other.

A die radial path L1 of a radial section of the extrusion section from a central axis X to the annular groove includes an extrusion groove inner section L2 and an extrusion groove outer section L3. An average groove width of the extrusion grooves of the extrusion groove inner section L2 is smaller than an average groove width of the extrusion grooves of the extrusion groove outer section L3, and a length of the extrusion groove inner section L2 in the die radial path L1 accounts for 71%-87%. When the length of the extrusion groove inner section in the die radial path accounts for smaller than 71%, the back pressure of the honeycomb structure body prepared by the molding die is significantly increased; when the length of the extrusion groove inner section in the die radial path accounts for greater than 87%, the strength of the honeycomb structure body prepared by the molding die is not increased significantly.

Figure 2:
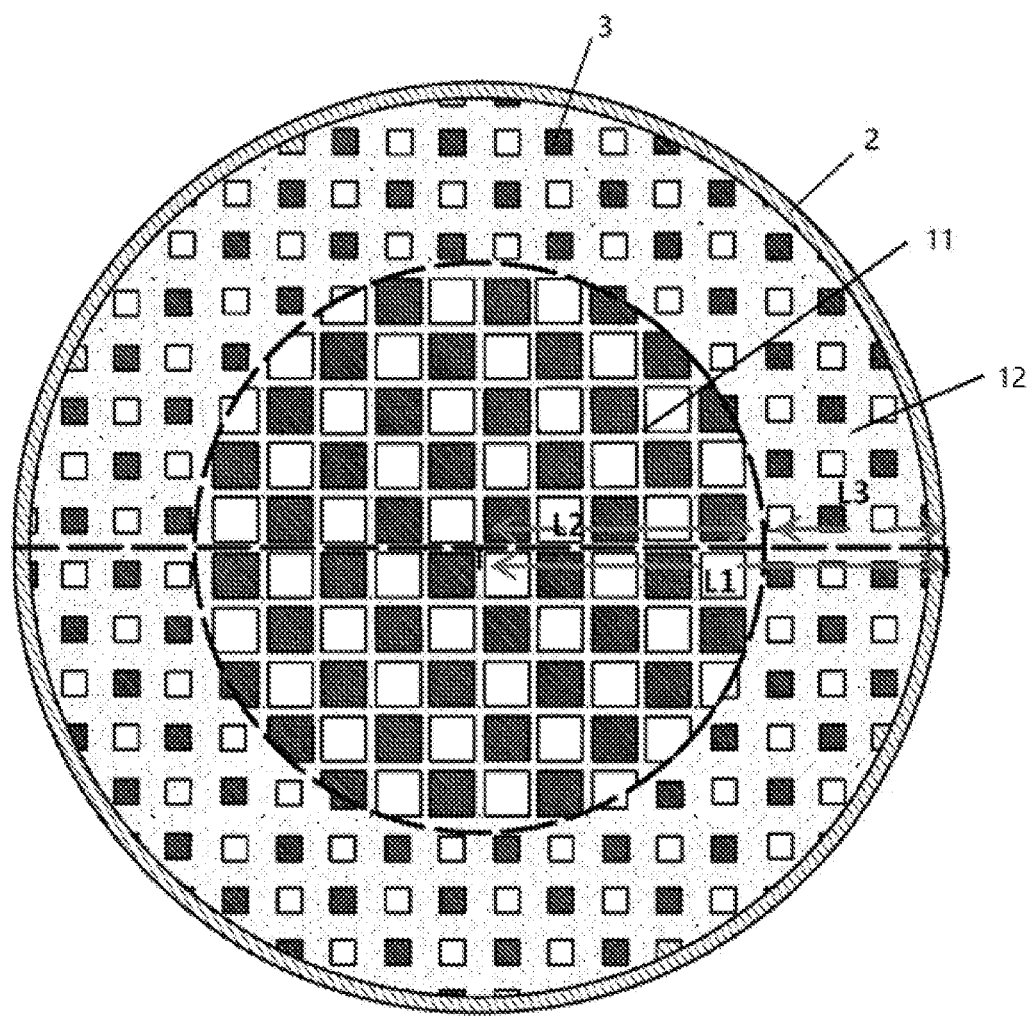
FIG. 2 is a top view of a honeycomb structure body according to an embodiment of the present application.

With reference to FIGS. 1 and 2, the honeycomb structure body prepared by the extrusion molding die is a cylindrical shape but not limited to a cylindrical shape. When the annular groove 13 is molded by mud extrusion, the skin layer 2 of the honeycomb structure body is formed; the prepared honeycomb structure body is integrally molded without secondary coating on the skin layer, which improves the production efficiency, reduces the processing steps, and reduces the cost while increasing the strength of the prepared honeycomb structure body.

The groove widths of the extrusion grooves of the extrusion groove inner section and the groove widths of the extrusion grooves of the extrusion groove outer section may be a uniform groove width or a non-uniform groove width. If the groove widths of the extrusion grooves of the extrusion groove inner section and the groove widths of the extrusion grooves of the extrusion groove outer section are non-uniform groove widths, a maximum groove width of the extrusion grooves of the extrusion groove inner section is not greater than a minimum groove width of the extrusion grooves of the extrusion groove outer section. The groove widths of the extrusion grooves of the extrusion groove inner section and the groove widths of the extrusion grooves of the extrusion groove outer section may be configured such that the radial groove width of the radial section of the extrusion section increases uniformly from the central axis to the annular groove. Preferably, the groove widths of the extrusion grooves of the extrusion groove inner section are equal, and the groove widths of the extrusion grooves of the extrusion groove outer section are equal. A ratio of an average groove width of the extrusion grooves of the extrusion groove inner section to an average groove width of the extrusion grooves of the extrusion groove outer section is 1:1.2-1.8. Preferably, a ratio of an average groove width of the extrusion grooves of the extrusion groove inner section to an average groove width of the extrusion grooves of the extrusion groove outer section 1:1.3-1.7. More preferably, a ratio of an average groove width of the extrusion grooves of the extrusion groove inner section to an average groove width of the extrusion grooves of the extrusion groove outer section is 1:1.3-1.5. The increase of the groove width of the extrusion groove outer section may increase the strength of the honeycomb structure body prepared by the extrusion die; when the ratio of an average groove width of the extrusion grooves of the extrusion groove inner section to an average groove width of the extrusion grooves of the extrusion groove outer section is smaller than 1:1.2, the strength of the honeycomb structure body prepared by the extrusion die is not increased significantly; when the ratio of an average groove width of the extrusion grooves of the extrusion groove inner section to an average groove width of the extrusion grooves of the extrusion groove outer section is greater than 1:1.8, excessive difference in the groove widths of the extrusion grooves of the extrusion groove inner section and the extrusion groove outer section results in a decrease in the thermal shock resistance of the honeycomb structure body prepared by the extrusion die.

The groove width of the extrusion groove inner section is 0.15 mm-0.40 mm. Preferably, the groove width of the extrusion groove inner section is 0.20 mm-0.24 mm. More preferably, the groove width of the extrusion groove inner section is 0.22 mm. Preferably, the groove widths of the extrusion grooves of the extrusion groove inner section are equal, and the groove widths of the extrusion grooves of the extrusion groove outer section are equal.

Optionally, an angle α between the side surface of the extrusion groove array and an axis of the molding die is 30°-60°. The angle α between the side surface of the extrusion groove array and an axis of the molding die is 37°-53°. More further, The angle α between the side surface of the extrusion groove array and an axis of the molding die is 40°-50°. When the angle α between the side surface of the extrusion groove array and an axis of the molding die is greater than 60°, gas channels connected to the skin layer of the honeycomb structure body with high porosity prepared by the extrusion die are likely to be squeezed and deformed, and the isostatic strength is significantly increased; when the angle α between the side surface of the extrusion groove array and an axis of the molding die is smaller than 30°, the skin layer of the honeycomb structure body prepared by the extrusion die is not strong enough and is likely to be damaged.

The side surface of the extrusion groove array is disposed in parallel with an inner wall of the die sleeve to form the annular groove, and the annular groove has a groove width of 0.5 mm-1.1 mm. Preferably, the annular groove has a groove width of 0.7 mm-1 mm. When the annular groove has a groove width smaller than 0.5 mm, the strength of the skin layer of the prepared honeycomb structure body is low; when the annular groove has a groove width greater than 1.1 mm, a slurry is prone to squeeze and deform a pore shape of the filter. The extrusion groove array communicates with the annular groove, and the section of the extrusion groove array is of a square lattice structure.

The injection holes 9 are cylindrical, and the injection holes 9 and intersections of the intersecting extrusion grooves 10 communicate with each other. Preferably, the axial section of the extrusion groove array is an inverted trapezoid structure. The injection holes 9 have a depth of 5 mm-40 mm, and the injection holes 9 have a hole diameter of 0.6 mm-3.0 mm. Preferably, the injection holes 9 have a depth of 10 mm-30 mm, and the injection holes 9 have a hole diameter of 0.9 mm-2.0 mm.

Figure 3:
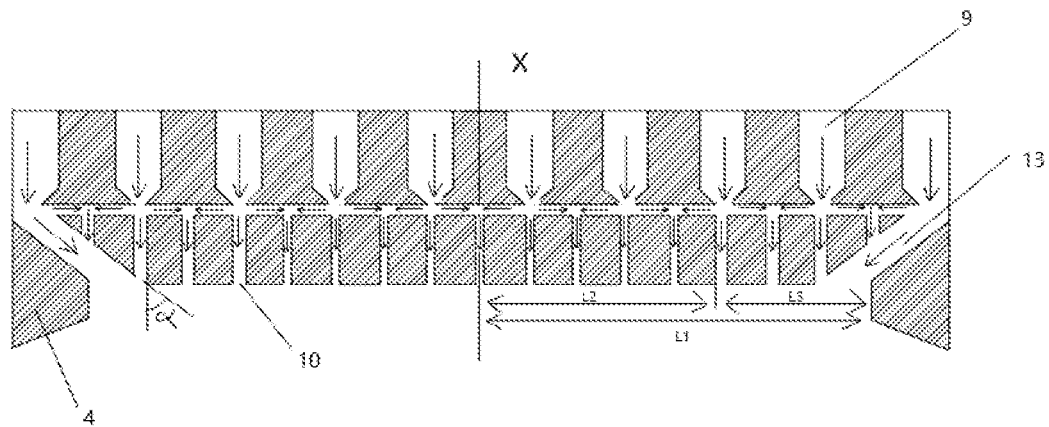
FIG. 3 is a cross-section diagram of a die related to an embodiment of the present application.
Figure 4:
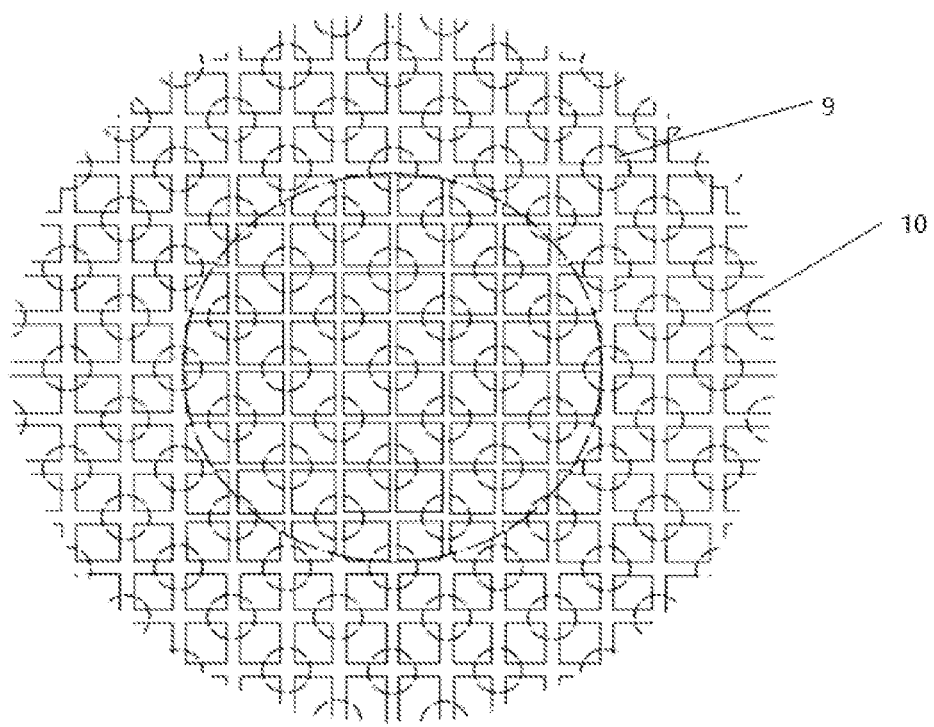
FIG. 4 is a schematic diagram showing an end of a die related to an embodiment of the present application.

The method of using the extrusion die is: mud enters the extrusion grooves 10 and the annular groove 13 from the injection holes 9 through the pressure of a hydraulic machine and is extruded downward (the arrow in FIG. 3 is the direction of the mud extrusion); due to the existence of the annular groove 13, the skin layer 2 of the honeycomb structure body is produced when the mud is extruded; the extrusion groove array forms parallel honeycomb gas channels 3. Through the configuration of the groove width of the annular groove 13, the groove widths of the extrusion grooves 10, and the angle α between the side surface of the extrusion groove array and the axis of the molding die, the strength of the honeycomb structure body may be ensured; the annular groove 13 communicates with the extrusion groove outer section, which ensures the quality of the product.

Embodiment 1 Preparation of Honeycomb Structure Body 1 #

The preparation method for the honeycomb structure body 1 # includes the following steps of:

1) preparation of clay: a ceramic raw material of 100 g which may be fired into a cordierite ceramic honeycomb, a binder of 6 g, a pore former of 15 g and a lubricant of 2 g are mixed in a colter, and the mixed mud is kneaded or refined into a clay; the ceramic clay raw material may be selected from a mixture of talc, kaolin, calcined kaolin, alumina, aluminum hydroxide, boehmite and silica which may be prepared into a cordierite; the binder is hydroxypropyl methyl cellulose; the pore former material is potato starch; the lubricant is tall oil fatty acid.

2) preparation of green body: clay is extruded and molded with a twin-screw extruder, and prepared into a cylindrical honeycomb structure green body primary product through a first die, then cut, dried with microwave and prepared into a ceramic honeycomb green body with a specific height;

3) plugging: the ceramic honeycomb green body is punched with a laser and plugged to form a "chess" type of cross-plugged honeycomb structure body;

4) sintering: the ceramic honeycomb green body after plugging is subject to debinding and sintered to prepare the honeycomb structure body 1 #. The honeycomb structure body 1 # has a skin layer with a thickness of 0.80 mm, an outer porous wall with a thickness of 0.30 mm, an inner porous wall with a thickness of 0.22 mm, and a ratio (L2/L1) of the porous wall inner section to a sum of the porous wall outer section and the porous wall inner section of 0.8:1.

Embodiment 2 Preparation of Honeycomb Structure Bodies 2 #-9 # and Comparative Honeycomb Structure Bodies 1 #-6 #

A honeycomb structure body 2 #, a honeycomb structure body 3 #, a honeycomb structure body 4 #, a honeycomb structure body 5 #, a honeycomb structure body 6 #, a honeycomb structure body 7 #, a honeycomb structure body 8 #, a honeycomb structure body 9 #, a comparative honeycomb structure body 1 #, a comparative honeycomb structure body 2 #, a comparative honeycomb structure body 3 #, a comparative honeycomb structure body 4 #, a comparative honeycomb structure body 5 # and a comparative honeycomb structure body 6 # are prepared separately with different dies according to the preparation method of Embodiment 1. Structure parameters of the honeycomb structure bodies 2 #-9 # and the comparative honeycomb structure bodies 1 #-6 #: the thickness of the skin layer, the thickness of the outer porous wall D1, the ratio (D1/D2) of the thickness of the outer porous wall to the thickness of the inner porous wall, and a ratio of the porous wall inner section to a sum of the porous wall inner section and the porous wall outer section, namely the proportion (L2/L1) of the porous wall inner section in the radial path, are shown in Table 1, and the inner porous walls and the outer porous walls of the honeycomb structure bodies 1 #-9 # and the comparative honeycomb structure bodies 1 #-6 # have a uniform wall thickness.

TABLE 1

| | thickness of skin layer/mm | thickness of outer porous wall D1/mm | D1/D2 | L2/L1 |
|---|---|---|---|---|
| Honeycomb structure body 1# | 0.80 | 0.3 | 1.36 | 0.80 |
| Honeycomb structure body 2# | 0.80 | 0.28 | 1.27 | 0.80 |
| Honeycomb structure body 3# | 0.60 | 0.28 | 1.27 | 0.80 |
| Honeycomb structure body 4# | 0.60 | 0.35 | 1.59 | 0.75 |
| Honeycomb structure body 5# | 1.00 | 0.32 | 1.45 | 0.90 |
| Honeycomb structure body 6# | 1.00 | 0.35 | 1.59 | 0.75 |
| Honeycomb structure body 7# | 0.60 | 0.26 | 1.18 | 0.71 |
| Honeycomb structure body 8# | 0.60 | 0.28 | 1.27 | 0.85 |
| Honeycomb structure body 9# | 0.85 | 0.31 | 1.40 | 0.83 |
| Comparative honeycomb structure body 1# | 0.40 | 0.3 | 1.36 | 0.80 |
| Comparative honeycomb structure body 2# | 1.20 | 0.3 | 1.36 | 0.80 |
| Comparative honeycomb structure body 3# | 0.60 | 0.28 | 1.27 | 0.50 |
| Comparative honeycomb structure body 4# | 0.60 | 0.28 | 1.27 | 0.98 |
| Comparative honeycomb structure body 5# | 0.80 | 0.5 | 2.27 | 0.80 |
| Comparative honeycomb structure body 6# | 0.80 | 0.22 | 1 | 0.80 |

Embodiment 3 Performance Test for Honeycomb Structure Bodies 1 #-9 # and Comparative Honeycomb Structure Bodies 1 #-6 #

Tests of the isostatic strength, the back pressure and the thermal shock resistance are performed on the honeycomb structure bodies 1 #-9 # and the comparative honeycomb structure bodies 1 #-6 # prepared by Embodiments 1 and 2. For the test of back pressure, taking a test value of the back pressure of the honeycomb structure body 1 # as 100%, the test values of the back pressures of the honeycomb structure bodies 2 #-9 # and the comparative honeycomb structure bodies 1 #-6 # are compared with that of the honeycomb structure body 1 #; if the result exceeds 100%, it indicates that the back pressure is greater than that of the honeycomb structure body 1 #, and if the result is smaller than 100%, it indicates that the back pressure is smaller than that of the honeycomb structure body 1 #. Comprehensive evaluation is performed on the above three indicators; the honeycomb structure body with an isostatic strength of ≥1.05 Mpa, a back pressure of ≤115% and a thermal shock resistance of greater than 650° C. is evaluated as "qualified", and the honeycomb structure body that does not meet any of the above three evaluation criteria is considered "unqualified". Test results of the isostatic strength, the back pressure and the thermal shock resistance for the honeycomb structure bodies 1 #-9 #and the comparative honeycomb structure bodies 1 #-6 #are shown in Table 2.

TABLE 2

|  | isostatic strength/ Mpa | back pressure | thermal shock resistance | evaluation |
|---|---|---|---|---|
| Honeycomb structure body 1# | 1.2 | 100% | 700° C. | qualified |
| Honeycomb structure body 2# | 1.15 | 85% | 650° C. | qualified |
| Honeycomb structure body 3# | 1.05 | 90% | 650° C. | qualified |
| Honeycomb structure body 4# | 1.3 | 108% | 700° C. | qualified |
| Honeycomb structure body 5# | 1.05 | 96% | 650° C. | qualified |
| Honeycomb structure body 6# | 1.5 | 110% | 650° C. | qualified |
| Honeycomb structure body 7# | 1.05 | 93% | 700° C. | qualified |
| Honeycomb structure body 8# | 1.1 | 93% | 700° C. | qualified |
| Honeycomb structure body 9# | 1.26 | 88% | 700° C. | qualified |
| Comparative honeycomb structure body 1# | 0.85 | 100% | 650° C. | unqualified |
| Comparative honeycomb structure body 2# | 1.3 | 105% | 550° C. | unqualified |
| Comparative honeycomb structure body 3# | 1.8 | 150% | 500° C. | unqualified |
| Comparative honeycomb structure body 4# | 1 | 90% | 650° C. | unqualified |
| Comparative honeycomb structure body 5# | 2.1 | 120% | 500° C. | unqualified |
| Comparative honeycomb structure body 6# | 0.9 | 88% | 500° C. | unqualified |

Comprehensive evaluation of the isostatic strength, the back pressure and the thermal shock resistance for the honeycomb structure bodies 1 #-9 #is "qualified". Comprehensive performance of the isostatic strength, the back pressure and the thermal shock resistance for the honeycomb structure body 9 #is the best. For the comparative honeycomb structure bodies 1 #-2 #, the thickness of the skin layer affects the isostatic strength and the thermal shock resistance; when the thickness of the skin layer is small, the isostatic strength is smaller than 1.05 Mpa; when the thickness of the skin layer is large, the thermal shock resistance is insufficient, which results in "unqualified" evaluation. Since the proportion of the enhanced region for the wall thickness of the comparative honeycomb structure bodies 3 #-4 #is too large or too small, the evaluation is "unqualified"; when the enhanced region for the wall thickness is too large, i.e., L2/L1 is too small, the back pressure is significantly increased; when the enhanced region for the wall thickness is too small, i.e., L2/L1 is to large, the isostatic strength may not be improved. Too much enhancement of the thicknesses of the outer porous wall and the inner porous wall of the comparative honeycomb structure body 5 #causes deterioration of the performance, which results in "unqualified" evaluation; therefore, the more the enhancement of the wall thickness, the larger the difference in the wall thickness, causing a decrease in the thermal shock resistance. The wall thickness of the comparative honeycomb structure body 6 #has a uniform wall thickness, which is not enhanced, and the isostatic strength is small, which results in "unqualified" evaluation.

Embodiment 4 Application of Die 1'#in Preparation of Honeycomb Structure Body 1 #

The preparation method for the honeycomb structure body 1 #includes the following steps of:

1) preparation of clay: a ceramic raw material of 100 g which may be fired into a cordierite ceramic honeycomb, a binder of 6 g, a pore former of 15 g and a lubricant of 2 g are mixed in a colter, and the mixed mud is kneaded or refined into a clay; the ceramic clay raw material may be selected from a mixture of talc, kaolin, calcined kaolin, alumina, aluminum hydroxide, boehmite and silica which may be prepared into a cordierite; the binder is hydroxypropyl methyl cellulose; the pore former material is potato starch; the lubricant is tall oil fatty acid.

2) preparation of green body: the clay is extruded and molded with a twin-screw extruder, and prepared into a cylindrical honeycomb structure green body primary product through a first die 1'#, then cut, dried with microwave and prepared into a ceramic honeycomb green body with a specific height; the first die 1'#has an annular groove with a width of 0.8 mm, a groove width of an extrusion groove outer section of 0.30 mm, a groove width of an extrusion groove inner section of 0.22 mm, a ratio (L2/L1) of the extrusion groove inner section to a sum of the extrusion groove inner section and the extrusion groove outer section of 0.8:1, and an angle α between a side surface of the extrusion groove array and an axis of the molding die of 45°;

3) plugging: the ceramic honeycomb green body is punched with a laser and plugged to form a "chess" type of cross-plugged honeycomb structure body;

4) sintering: the ceramic honeycomb green body after plugging is subjected to debinding and sintered to prepare the honeycomb structure body 1 #.

Embodiment 5 Preparation of Honeycomb Structure Bodies 2 #-11 #With Dies 2-11' and Comparative Honeycomb Structure Bodies 1 #-8 #With Comparative Dies 1-8'

A honeycomb structure body 2 #(prepared by a die 2'#), a honeycomb structure body 3 #(prepared by a die 3'#), a honeycomb structure body 4 #(prepared by a die 4'#), a honeycomb structure body 5 #(prepared by a die 5'#), a honeycomb structure body 6 #(prepared by a die 6'#), a honeycomb structure body 7 #(prepared by a die 7'#), a honeycomb structure body 8 #(prepared by a die 8'#), a honeycomb structure body 9 #(prepared by a die 9'#), a honeycomb structure body 10 #(prepared by a die 10'#), a honeycomb structure body 11 #(prepared by a die 11'#), a comparative honeycomb structure body 1 #(prepared by a comparative die 1'#), a comparative honeycomb structure body 2 #(prepared by a comparative die 2'#), a comparative honeycomb structure body 3 #(prepared by a comparative die 3'#), a comparative honeycomb structure body 4 #(prepared by a comparative die 4'#), a comparative honeycomb structure body 5 #(prepared by a comparative die 5'#), a comparative honeycomb structure body 6 #(prepared by a comparative die 6'#), and a comparative honeycomb structure body 7 #(prepared by a comparative die 7'#) are prepared separately with different dies according to the preparation method of Embodiment 4. Structure parameters of the dies 2'#-11'#corresponding to the honeycomb structure bodies 2 #-11 #and the comparative dies 1'#-8'#corresponding to the comparative honeycomb structure bodies 1 #-8 #: the groove width of the annular groove, the groove widths D1 of the extrusion grooves of the extrusion groove outer section, the ratio (D1/D2) of the groove widths of the extrusion grooves of the extrusion groove outer section to the groove widths of the extrusion grooves of the extrusion groove inner section, and the extrusion groove inner section/(a sum of the extrusion groove inner section and the extrusion groove outer section) (L2/L1) are shown in Table 3, and the groove widths of the extrusion grooves of the extrusion groove inner section and the extrusion groove outer section of the dies 1'#-11'#and the comparative dies 1'#-8'#have a uniform groove width, the injection holes have a hole diameter of 1.5 mm, the injection holes have a depth of 20 mm.

TABLE 3

| | groove width of annular groove/mm | groove width of extrusion groove outer section D1/mm | D1/D2 | L2/L1 | angle α between side surface of extrusion groove array and axis of molding die |
|---|---|---|---|---|---|
| die 1'# | 0.80 | 0.3 | 1.36 | 0.80 | 45° |
| die 2'# | 0.80 | 0.28 | 1.27 | 0.80 | 45° |
| die 3'# | 0.60 | 0.28 | 1.27 | 0.80 | 45° |
| die 4'# | 0.60 | 0.35 | 1.59 | 0.75 | 45° |
| die 5'# | 1.00 | 0.32 | 1.45 | 0.87 | 45° |
| die 6'# | 1.00 | 0.35 | 1.59 | 0.75 | 45° |
| die 7'# | 0.60 | 0.26 | 1.18 | 0.71 | 45° |
| die 8'# | 0.60 | 0.28 | 1.27 | 0.85 | 45° |
| die 9'# | 0.85 | 0.31 | 1.40 | 0.83 | 45° |
| die 10'# | 0.80 | 0.3 | 1.36 | 0.8 | 37° |
| die 11'# | 0.80 | 0.3 | 1.36 | 0.8 | 53° |
| comparative die 1'# | 0.40 | 0.3 | 1.36 | 0.80 | 45° |
| comparative die 2'# | 1.20 | 0.3 | 1.36 | 0.80 | 45° |
| comparative die 3'# | 0.60 | 0.28 | 1.27 | 0.50 | 45° |
| comparative die 4'# | 0.60 | 0.28 | 1.27 | 0.98 | 45° |
| comparative die 5'# | 0.80 | 0.5 | 2.27 | 0.80 | 45° |
| comparative die 6'# | 0.80 | 0.22 | 1 | 0.80 | 45° |
| comparative die 7'# | 0.60 | 0.28 | 1.27 | 0.80 | 25° |
| comparative die 8'# | 0.80 | 0.30 | 1.36 | 0.8 | 65° |

Embodiment 6 Performance Test for Honeycomb Structure Bodies 10 #and 11 #and Comparative Honeycomb Structure Bodies 7 #and 8 #

Tests of the isostatic strength, the back pressure and the thermal shock resistance are performed on the honeycomb structure bodies 10 #and 11 #and comparative honeycomb structure bodies 7 #and 8 #prepared by Embodiment 5. For the test of back pressure, taking a test value of the back pressure of the honeycomb structure body 1 #as 100%, the test values of the back pressures of the honeycomb structure bodies 10 #and 11 #and the comparative honeycomb structure bodies 7 #and 8 #are compared with that of the honeycomb structure body 1 #; if the result exceeds 100%, it indicates that the back pressure is greater than that of the honeycomb structure body 1 #, and if the result is smaller than 100%, it indicates that the back pressure is smaller than that of the honeycomb structure body 1 #. Comprehensive evaluation is performed on the above three indicators; the honeycomb structure body with an isostatic strength of ≥1.05 Mpa, a back pressure of ≤115% and a thermal shock resistance of greater than 650° C. is evaluated as "qualified", and the honeycomb structure body that does not meet any of the above three evaluation criteria is considered "unqualified". Test results of the isostatic strength, the back pressure and the thermal shock resistance for the honeycomb structure bodies 10 #and 11 #and comparative honeycomb structure bodies 7 #and 8 #are shown in Table 4.

TABLE 4

| | isostatic strength/Mpa | back pressure | thermal shock resistance | evaluation |
|---|---|---|---|---|
| Honeycomb structure body 10# | 1.13 | 105% | 650° C. | qualified |
| Honeycomb structure body 11# | 1.24 | 98% | 700° C. | qualified |
| Comparative honeycomb structure body 7# | 0.8 | 110% | 650° C. | unqualified |
| Comparative honeycomb structure body 8# | 0.7 | 100% | 500° C. | unqualified |

Comprehensive evaluation of the isostatic strength, the back pressure and the thermal shock resistance for the honeycomb structure bodies 1 #-11 #is "qualified". Comprehensive performance of the isostatic strength, the back pressure and the thermal shock resistance for the honeycomb structure body 9 #is the best. For the comparative honeycomb structure bodies 1 #-2 #, the thickness of the skin layer 2 (equivalent to the groove width of the annular groove 13 of the comparative dies 1'#-2'#) affects the isostatic strength and the thermal shock resistance; when the thickness of the skin layer 2 is small, the isostatic strength is smaller than 1.05 Mpa; when the thickness of the skin layer 2 is large, the thermal shock resistance is insufficient, which results in "unqualified" evaluation. Since the proportion (equivalent to the ratio of the region of the extrusion groove outer section of the comparative dies 3'#-4'#to the radial section region of the extrusion section) of the enhanced region (equivalent to other regions besides the inner porous wall 11 in FIG. 2) for the wall thickness of the gas channel wall of the comparative honeycomb structure bodies 3 #-4 #is too large or too small, the evaluation is "unqualified"; when the enhanced region (equivalent to the ratio of other regions besides the extrusion groove inner section 4 in FIG. 4 to the radial section region of the extrusion section) for the gas channel wall thickness is too large, i.e., L2/L1 is too small, the back pressure is significantly increased; when the enhanced region for the wall thickness is too small, i.e., L2/L1 is too large, the isostatic strength may not be improved. More enhancement of the wall thickness of the outer porous wall 12 (the region between the inner porous wall 11 and the skin layer 2 in FIG. 2) of the comparative honeycomb structure body 5 #than the enhancement of the wall thickness of the inner porous wall (equivalent to the groove width of the extrusion groove outer section being larger than that of the extrusion groove inner section) causes deterioration of the performance, which results in "unqualified" evaluation; therefore, the more the enhancement of the wall thickness, the larger the difference in the wall thickness, causing a decrease in the thermal shock resistance. The wall thickness of the comparative honeycomb structure body 6 #has a uniform wall thickness (equivalent to all groove widths of the extrusion grooves being average values), the isostatic strength is small, which results in "unqualified" evaluation. For the comparative honeycomb structure bodies 7 #-8 #, when the angle α between the side surface of the extrusion groove array and an axis of the molding die is smaller than the range of the present application, the skin layer of the honeycomb structure body prepared by the extrusion die has insufficient strength and is prone to be damaged; when the angle α between the side surface of the extrusion groove array and an axis of the molding die is greater than the range of the present application, gas channels connected to the skin layer of the honeycomb structure body with high porosity prepared by the extrusion die are likely to be deformed by extrusion, and the isostatic strength is significantly reduced.

The above is only the embodiments of the present application, and the protection scope of the present application is not limited by these specific embodiments, but is determined by the claims of the present application. For those skilled in the art, the present application may have various modifications and changes. Any modification, equivalent replacement, improvement, etc. made within the technical ideas and principles of the present application shall be included in the protection scope of the present application.

The invention claimed is:

1. A honeycomb structure body, comprising a honeycomb body and a skin layer around the honeycomb body, the honeycomb body comprising axially-extending channels defined by a porous wall, wherein a radial path of a radial section of the honeycomb body from a central axis to the skin layer consists of a porous wall inner section and a porous wall outer section in sequence; an average wall thickness of inner porous walls provided in the porous wall inner section is smaller than an average wall thickness of outer porous walls provided in the porous wall outer section, and a length of the porous wall inner section in the radial path accounts for 80%-95%;

a pore density of the inner porous walls is approximately the same as that of the outer porous walls;

the inner porous walls have a wall thickness of 0.15 mm-0.40 mm; a maximum thickness of the inner porous walls is not greater than a minimum thickness of the outer porous walls;

a ratio of the average wall thickness of the inner porous walls to the average wall thickness of the outer porous walls is 1:1.1-1.8;

the skin layer has a thickness of 0.5 mm-1.1 mm.

2. The honeycomb structure body according to claim 1, wherein a ratio of the average wall thickness of the inner porous walls to the average wall thickness of the outer porous walls is 1:1.1-1.7.

3. The honeycomb structure body according to claim 1, wherein the inner porous walls and/or the outer porous walls have a uniform wall thickness.

4. The honeycomb structure body according to claim 1, wherein the skin layer has a thickness of 0.7 mm-1 mm.

5. The honeycomb structure body according to claim 1, wherein the honeycomb
body is a cylinder body, radial sections of the channels are of a square lattice structure, and the channels comprises inlet channels and outlet channels.

6. A method for preparing the honeycomb structure body according to claim 1, wherein by the method, the honeycomb structure body, of which the honeycomb body and the skin layer are integrally molded, is prepared by extruding a raw material through an extruder.

* * * * *